(12) United States Patent
Pappachan et al.

(10) Patent No.: US 11,537,457 B2
(45) Date of Patent: Dec. 27, 2022

(54) LOW LATENCY REMOTING TO ACCELERATORS

(71) Applicant: Intel Corporation, Santa Clara, CA (US)

(72) Inventors: Pradeep Pappachan, Tualatin, OR (US); Sujoy Sen, Beaverton, OR (US); Joseph Grecco, Saddle Brook, NJ (US); Mukesh Gangadhar Bhavani Venkatesan, Bangalore (IN); Reshma Lal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/304,820

(22) Filed: Jun. 25, 2021

(65) Prior Publication Data
US 2021/0318920 A1 Oct. 14, 2021

(51) Int. Cl.
*G06F 9/54* (2006.01)

(52) U.S. Cl.
CPC .............. *G06F 9/547* (2013.01); *G06F 9/546* (2013.01)

(58) Field of Classification Search
CPC .................................. G06F 9/547; G06F 9/546
See application file for complete search history.

(56) References Cited

U.S. PATENT DOCUMENTS

| | | | |
|---|---|---|---|
| 2008/0114937 A1* | 5/2008 | Reid | G06F 11/362 710/22 |
| 2019/0042234 A1* | 2/2019 | Bernat | G06F 9/4494 |
| 2020/0014560 A1* | 1/2020 | Tørudbakken | G06F 12/0813 |

* cited by examiner

*Primary Examiner* — S. Sough
*Assistant Examiner* — Kimberly L Jordan
(74) *Attorney, Agent, or Firm* — Jaffery Watson Mendonsa & Hamilton LLP

(57) ABSTRACT

A method of offloading performance of a workload includes receiving, on a first computing system acting as an initiator, a first function call from a caller, the first function call to be executed by an accelerator on a second computing system acting as a target, the first computing system coupled to the second computing system by a network; determining a type of the first function call; and generating a list of parameter values of the first function call.

18 Claims, 9 Drawing Sheets

LOW LATENCY REMOTING TO ACCELERATORS

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2021, Intel Corporation. All Rights Reserved.

BACKGROUND

In some cloud and high-volume data analytics computing environments, compute intensive workloads are often offloaded from processors to accelerators to achieve higher performance. In one scenario, at least part of the workload is offloaded to an accelerator in the same computing system as a processor executing other parts of the workload. In another scenario, at least part of the workload is offloaded to an accelerator in another computing system (sometimes called a disaggregated accelerator) coupled via a network to the computing system including the processor executing the other parts of the workload. In this scenario, the latency involved in offloading the workload across the network may negatively affect overall system performance.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
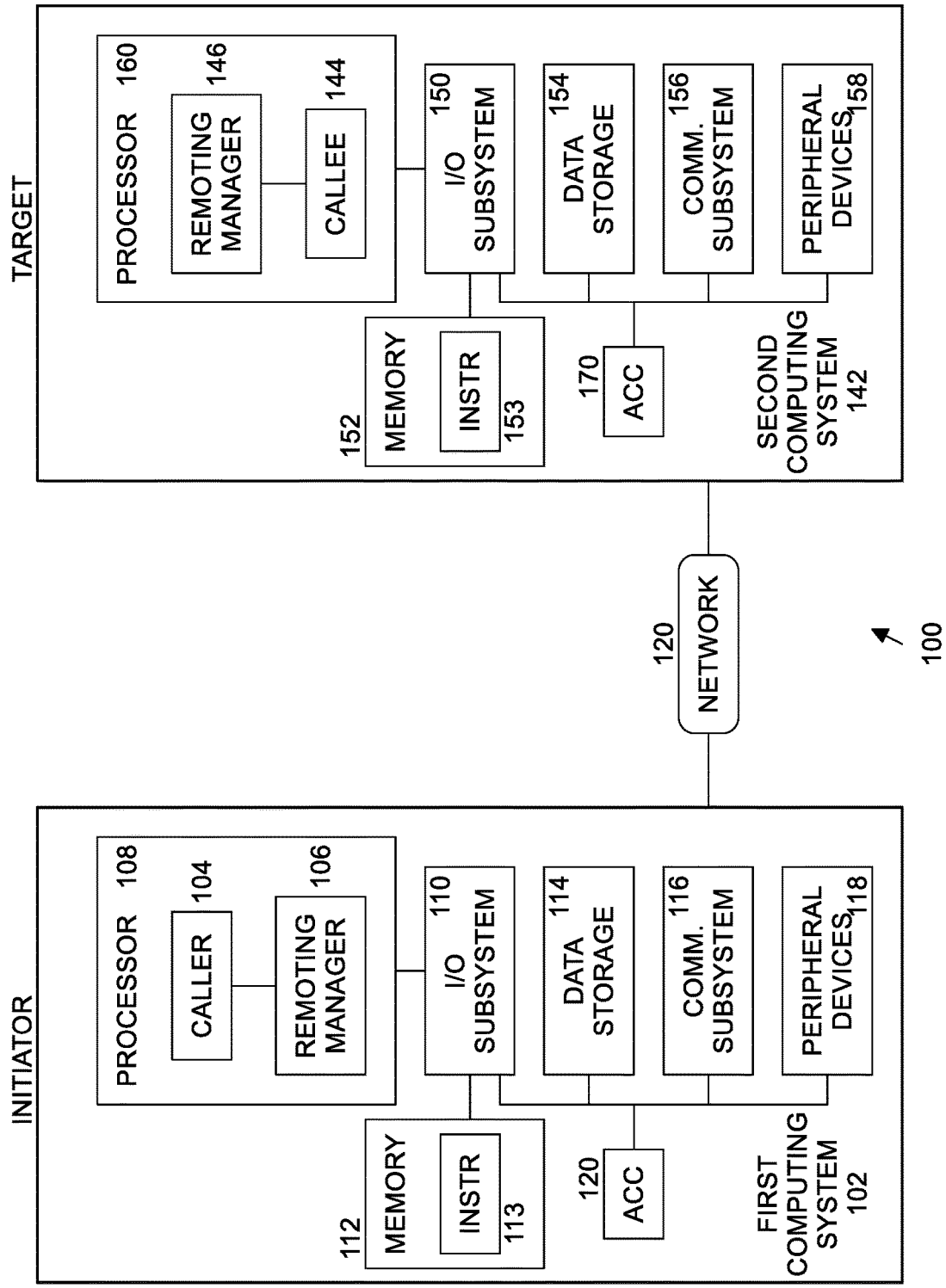
FIG. 1 is a block diagram of two computing systems according to one or more embodiments.

The technology described herein reduces the effect of network latency associated with running a workload on a remote accelerator or other computing device by remoting function calls (e.g., calls received via application programming interfaces (APIs)) to improve overall system performance. The technology enables asynchronous execution of remoted functions to overlap network transmission of messages between computing systems. This helps offloading workloads to disaggregated accelerators become more efficient in computing systems.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Referring now to FIG. 1, an illustrative computing environment 100 for low area, low power, low latency and high throughput processing for processor-accelerator communication includes first computing system 102 and second computing system 142 coupled over network 120. In one embodiment, first computing system 102 is also called an initiator, and second computing system 142 is also called a target. In another embodiment, first computing system 102 acts as a target and second computing system 142 acts as an initiator. First computing system 102 includes processor 108 to execute instructions (Instr) 113 stored in memory 112. Instructions 113 comprise at least caller application 104 and remoting manager 106. Caller application 104 comprises an application program having at least one workload to be processed. In some processing scenarios, caller application 104 offloads one or more workloads to accelerator 120 to be performed more efficiently than performing the one or more workloads on processor 108. Caller application 104 offloads a workload by making a function call using an API to remoting manager 106 (e.g., instructing the remoting manager to send the workload to be processed on an accelerator 120 on this computing system). In at least one embodiment, accelerator 120 is implemented as a field programmable gate array (FPGA). Since the communication between processor 108 and accelerator 120 is within first computing system 102, this communication is performed with a first latency.

Second computing system 142 includes processor 160 to execute instructions (Instr) 153 stored in memory 152. Instructions 153 comprise at least callee application 144 and remoting manager 146. Callee application 144 comprises an application program having at least one workload to be processed. In some processing scenarios, callee application 144 accepts the offload of one or more workloads to accelerator 170 in second computing system 142 to be performed more efficiently than performing the one or more workloads on processor 108. In at least one embodiment, accelerator 170 is implemented as a field programmable gate array (FPGA). This offloading requires that caller 104 being executed by processor 108 in first computing system 102 communicate (via remoting manager 106 and remoting manager 146) with callee 144 being executed by processor 160 in second computing system 142 over network 120. Since the communication between processor 108 and accelerator 170 is from first computing system 102 (the initiator) to second computing system 142 (the target) over network 120, this communication is performed with a second latency. This second latency is greater than the first latency, resulting in degradation of overall system performance of computing environment 100. The technology described herein employs remoting manager 106 being executed by processor 108 in first computing system 102 interacting with remoting manager 146 being executed by processor 160 in second computing system 142 to improve overall system performance of computing environment 100 by lessening the second latency.

In various computing environments, there may be any number of processors 108 and accelerators 120 on first computing system 102, any number of processors 160 and accelerators 170 on second computing system 142, and any number of first computing systems coupled to any number of second computing systems. In some large-scale cloud computing environments, the number of caller applications 104, callee applications 144, first computing systems 102, second computing systems 104, and associated accelerators 120, 170 may be large (e.g., tens of systems, hundreds of systems, thousands of systems, tens of thousands of systems, thousands or millions of callers and callees, etc.). Thus, any lessening of the second latency can have a significant impact on the overall performance of computing environment 100.

First computing system 102 and second computing system 142 can be embodied as any type of device capable of performing the functions described herein. For example, computing systems 102, 142 can be implemented as, without limitation, a computer, a laptop computer, a tablet computer, a notebook computer, a mobile computing device, a smartphone, a wearable computing device, a multiprocessor system, a server, a disaggregated server, a workstation, and/or a consumer electronic device. As shown in FIG. 1, the illustrative computing systems 102, 142 include processors 108, 160, input/output (I/O) subsystems 110, 150, memories 112, 152, and data storage devices 114, 154, respectively. Additionally, in some embodiments, one or more of the illustrative components can be incorporated in, or otherwise form a portion of, another component. For example, memories 112, 152, or portions thereof, can be incorporated in processors 108, 160, respectively, in some embodiments.

Processors 108, 160 can be implemented as any type of processor capable of performing the functions described herein. For example, processors 108, 160 can be embodied as a single or multi-core processor(s), digital signal processor, microcontroller, or other processor or processing/controlling circuit.

Memories 112, 142 can be implemented as any type of volatile or non-volatile memory or data storage capable of performing the functions described herein. In operation, the memories 112, 152 store various data and software used during operation of computing systems 102, 142 such as operating systems, applications, programs, libraries, and drivers. As shown, memories 112, 152 are communicatively coupled to the processors 108, 160 via I/O subsystems 110, 150 which are implemented as circuitry and/or components to facilitate input/output operations with processors 108, 120, memories 112, 152, and other components of the computing systems, respectively. For example, the I/O subsystems 110, 150 can be implemented as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, memories 112, 152 are directly coupled to processors 108, 160, respectively, for example via an integrated memory controller hub. Additionally, in some embodiments, I/O subsystems 110, 150 form a portion of a system-on-a-chip (SoC) and are incorporated, along with processors 108, 160, memories 112, 152 accelerators 120, 170, respectively, and/or other components of the computing systems, on a single integrated circuit chip. Additionally or alternatively, in some embodiments processors 108, 160 include an integrated memory controller and a system agent, which may be embodied as a logic block in which data traffic from processor cores and I/O devices converges before being sent to memories 112, 152.

Data storage devices 114, 154 can be implemented as any type of device or devices configured for short-term or long-term storage of data such as, for example, memory devices and circuits, memory cards, hard disk drives, solid-state drives, non-volatile flash memory, or other data storage devices. Computing systems 102, 142 can also include communications subsystems 116, 156 which can be implemented as any communication circuit, device, or collection thereof, capable of enabling communications between computing systems 102, 142 over a network 120. Communications subsystems 116, 156 can be configured to use any one or more communication technology (e.g., wired or wireless communications) and associated protocols (e.g., Ethernet, Bluetooth®, Wi-Fi®, WiMAX, 3G, 4G LTE, etc.) to implement such communication.

Accelerators 120, 170 can be implemented as a FPGA, an application-specific integrated circuit (ASIC), a coprocessor, or other digital logic device capable of performing accelerated functions (e.g., accelerated application functions, accelerated network functions, or other accelerated functions). Illustratively, accelerators 120, 170 are FPGAs, which are implemented as an integrated circuit including programmable digital logic resources that may be configured after manufacture. The FPGAs include, for example, a configurable array of logic blocks in communication over a configurable data interchange. Accelerators 120, 170 are coupled to the processors 108, 160 via high-speed connection interfaces such as peripheral buses (e.g., peripheral component interconnect (PCI) Express buses) or inter-processor interconnects (e.g., in-die interconnects (IDIs) or QuickPath Interconnects (QPIs)), or via any other appropriate interconnects. Accelerators 120, 170 receive data and/or commands for processing from the processors and return results data to the processors.

Computing systems 102, 142 further include one or more peripheral devices 118, 158. Peripheral devices 118, 158 include any number of additional input/output devices, interface devices, hardware accelerators, and/or other peripheral devices. For example, in some embodiments, peripheral devices 118, 158 include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

It is to be appreciated that lesser or more equipped computing systems than the examples described above may be preferred for certain implementations. Therefore, the configuration of computing systems 102, 142 can vary from implementation to implementation depending upon numerous factors, such as price constraints, performance requirements, technological improvements, or other circumstances. Examples of computing systems 102, 142 include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a disaggregated server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

The technology described herein can be implemented as any or a combination of one or more microchips or integrated circuits interconnected using a parent board, hardwired logic, software stored by a memory device and executed by a microprocessor, firmware, an application specific integrated circuit (ASIC), and/or an FPGA. The term "logic" includes, by way of example, software or hardware and/or combinations of software and hardware.

Remoting is the technique of executing a task by sending commands and data to a compute device or accelerator over a network. For example, an application running on one machine (such as caller application 104 on first computing system 102) might want to accelerate a task (for example, a machine learning (ML) inference) by running the task on an accelerator (such as accelerator 170) on a remote computing system (such as second computing system 142). The application or software libraries supporting the application use an API to communicate with a software device driver interfacing with the accelerator. If the accelerator was attached locally in the computing system running the application (e.g., first computing system 102), the communication between the application/library and the software device driver for the accelerator would occur in the form of local procedure calls. If, however, the accelerator was connected to a remote computing system (e.g., second computing system 142), the API function calls would have to be "remoted" to the software device driver running on the computing system connected to the accelerator over a network 120. In the technology described herein, this remoting is implemented by remoting managers on the two sides (e.g., remoting manager 106, remoting manager 146). First computing system 102 can be called an initiator (where the caller application 104 is located) and second computing system 142 can be called a target (where the callee application 144 and accelerator 170 are located). If the remoting is implemented naively, every API call that involved blocking (described below) would be made serially over the network 120 and incur the substantial overhead of network latency (for example, approximately 100 microseconds for a roundtrip on current datacenter networks).

Figure 2:
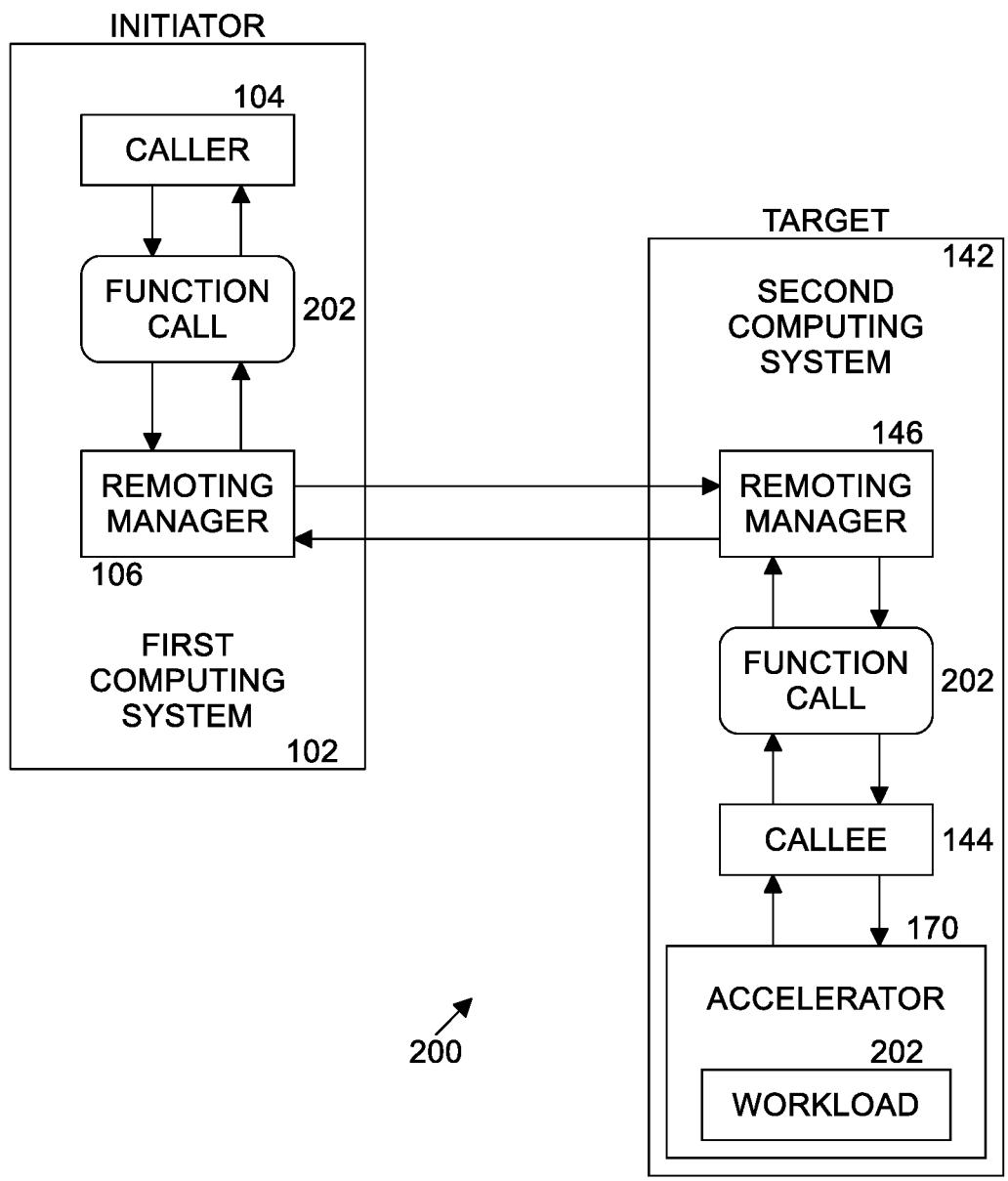
FIG. 2 is a block diagram of remoting a function call from a first computing system to a second computing system according to one or more embodiments.

FIG. 2 is a block diagram 200 of remoting a function call from a first computing system 102 to a second computing system 104 according to one or more embodiments. Caller 104 on first computing system 102 makes a function call 202 to remoting manager 106. In one example, function call 202 is a request to offload performance of a workload 202 from the first computing system to an accelerator 170 on second computing system 142. Function call 202 is provided by remoting manager 106 to implement the remote offload request. Remoting manager 106 sends the offload request to remoting manager 146 on second computing system 146 via network 120 (not shown in FIG. 2). Remoting manager 146 then makes a corresponding function call 202 to callee application 144. In at least one implementation, callee application 144 includes a software device driver (not shown) for interfacing with accelerator 170. In another implementation, the software device driver is a separate component from callee application 144. Accelerator 170 processes the workload 202 and returns results to callee application 144. Callee application 144 returns the results through function call 202 back to remoting manager 146. Remoting manager 146 sends the results to remoting manager 106 on first computing system 102 over the network. Remoting manager 106 returns the results through function call 202 to caller application 104. In an embodiment, remoting manager 106 and remoting manager 146 include identical code and can each operate as an initiator and/or a target.

Figure 3:
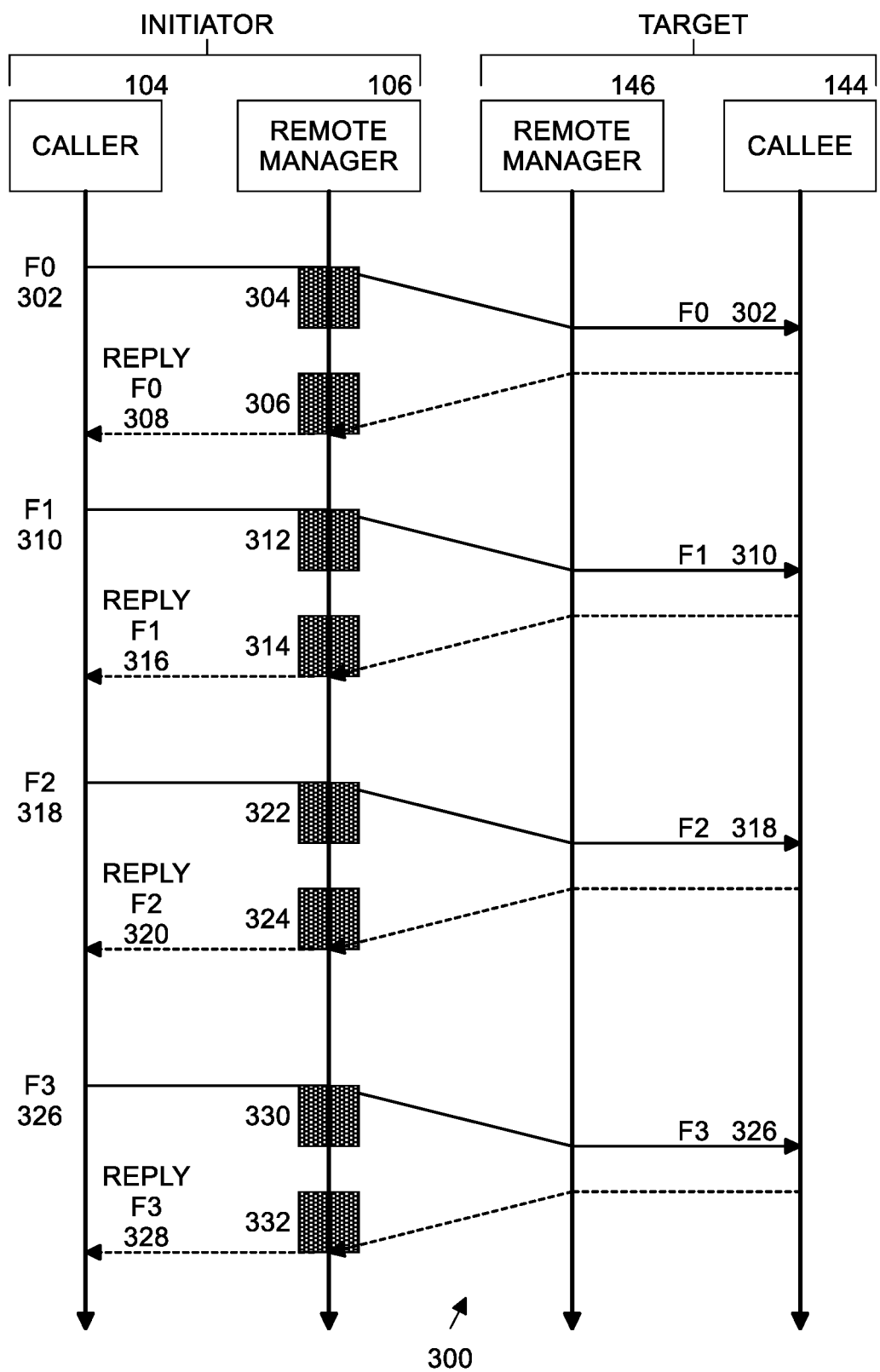
FIG. 3 is a timeline diagram of an example of remoting function calls according to one or more embodiments.

FIG. 3 is a timeline diagram 300 of an example of remoting function calls according to one or more embodiments. FIG. 3 shows the effect of serially remoting API function calls over the network. The initiator is the entity that invokes the API function call (e.g., caller application 104). The target consists of the software device driver (e.g., callee application 144) on the remote machine (e.g., second computing system 142) connected to the accelerator 170. The remoting managers 106, 146 on the initiator and target, respectively, connect the caller application 104 with the callee application 144 over the network. In this example, the caller 104 makes four synchronous API function calls (F0 302, F1 310, F2 318, and F3 326). After each function call, the remoting manager 106 on the first computing system 102 blocks, waiting for the response from the remoting manager 146 on the second computing system 142.

Delay due to network latency is shown in the shaded blocks in FIG. 2. When remoting manager 106 receives F0 302, remoting manager 106 sends F0 302 to remoting manager 146, which forwards the function call to callee 144. Remoting manager 106 waits for reply F0 308 from callee 144, which results in latencies 304 and 306. When remoting manager 106 receives F1 310, remoting manager 106 sends F1 310 to remoting manager 146, which forwards the function call to callee 144. Remoting manager 106 waits for reply F1 316 from callee 144, which results in latencies 312 and 314. When remoting manager 106 receives F2 318, remoting manager 106 sends F2 318 to remoting manager 146, which forwards the function call to callee 144. Remoting manager 106 waits for reply F2 320 from callee 144, which results in latencies 322 and 324. When remoting manager 106 receives F3 326, remoting manager 106 sends F3 326 to remoting manager 146, which forwards the function call to callee 144. Remoting manager 106 waits for reply F3 328 from callee 144, which results in latencies 330 and 332. As the number of API function calls for executing a task increases, so does the overall time for completing the task due to network communication overhead (e.g., including at least network latencies 304, 306, 312, 314, 322, 324, 330 and 332).

To reduce the effects of network latency, the technology described herein proposes overlapping code execution on the initiator and the target side with network transfers. The technology described herein makes the API function calls asynchronous, whenever possible, so that the initiator (e.g., caller application 104 and associated remoting manager 106) does not have to block and wait on every call. This requires exploitation of certain characteristics of the function being remoted. Analysis of functions typically used for remoting use cases reveals that not all function calls need to be synchronous in their operation. Some function calls do not return values that are consumed by the initiator before forward progress can be made.

Three types of function calls are identified: Type 0=asynchronously callable function without output dependencies, Type 1=asynchronously callable function with substitutable output parameters, and Type 2=synchronous function. A Type 0 function does not return a value that is used by the caller 104. While the function must be executed correctly, without errors, the caller does not expect the function to return a value that is used in any future computation. An example of such a function is a function that initializes a library. Assuming the function executes correctly on the target, it is possible to return to the caller 104 immediately, without blocking. A Type 1 function returns a value to the caller that it (the caller) may pass back as input to another function executed by the callee in the future. The value returned is not consumed by the caller in any other way. As an example, consider the creation of a command list to hold commands that will be submitted to the accelerator 170. When the list is created on the target by the invocation of, for example, a CreateCommandList( ) function by the caller, the callee returns an opaque handle that references the list. In the future, the caller would pass the handle of the command list back to the callee when it sends commands that must be appended to that command list. In this example, the CreateCommandList( ) function is a Type 1 function. A Type 1 function call can also return to the caller immediately with a pseudo-output value(s), but the remoting manager 146 and the target side (e.g., callee application 144) must keep track of the pseudo-return value(s) to identify the pseudo-return value later and substitute it with the real value (as described below). A Type 2 function returns a value to the caller that it (the caller) uses in its computation or is one that results in the transfer of some data from caller 104 to callee 144. For example, a function that submits a batch of commands to the accelerator 170 is a Type 2 function because the caller 104 might need the result of the computation or require the freeing of a resource (e.g., memory buffer) used in an earlier function call before it can proceed with its execution. Therefore, a Type 2 function call must always block the caller 104.

Figure 4:
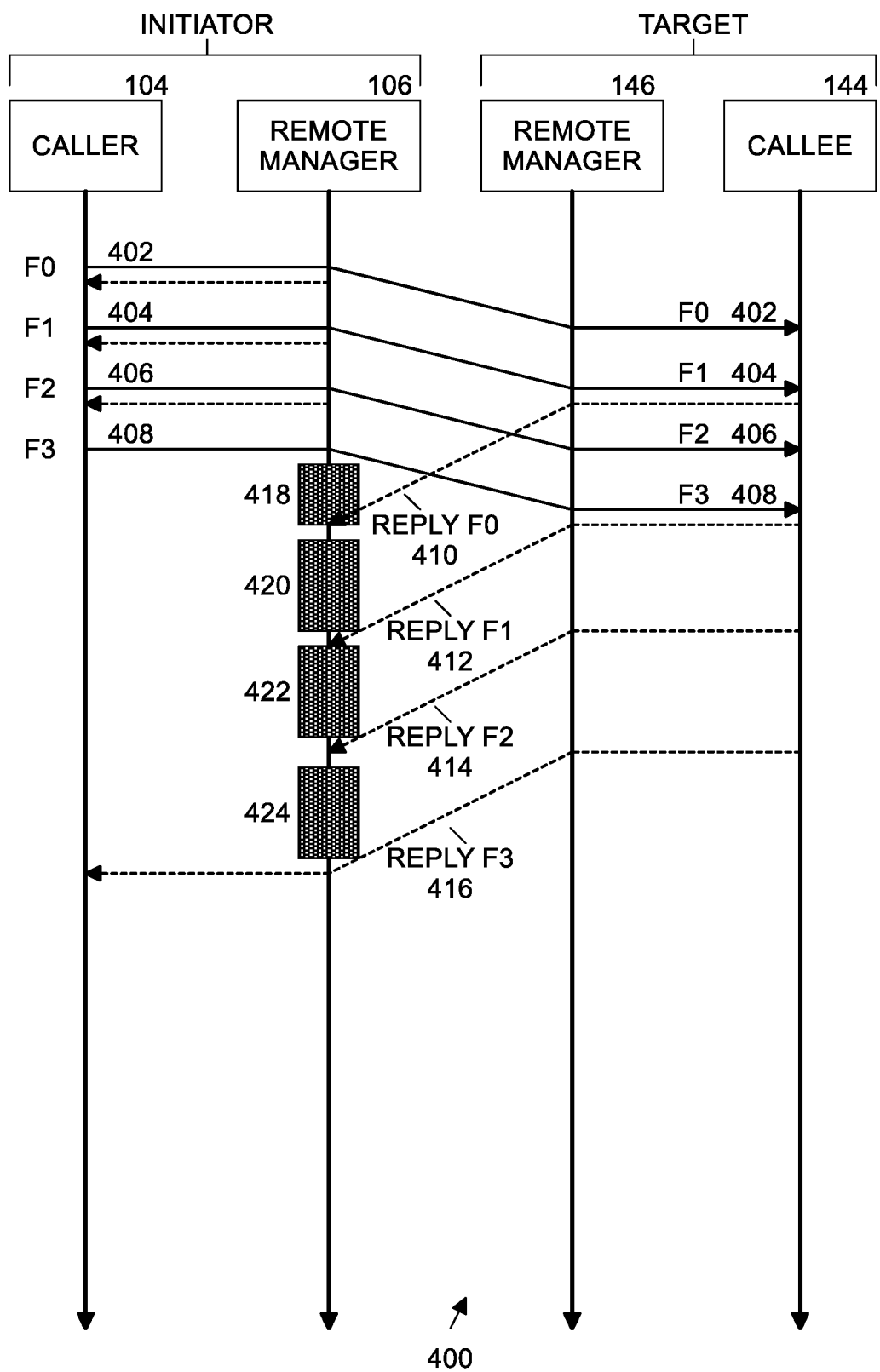
FIG. 4 is a timeline diagram of an example of remoting function calls according to one or more embodiments.

FIG. 4 is a timeline diagram 400 of an example of remoting function calls according to one or more embodiments. In the example shown in FIG. 4, the caller 104 makes a sequence of four function calls F0 402, F1 404, F2 406, and F3 408. In this example, the first three calls are either Type 0 or Type 1 calls that do not block the caller 104 (using the "no-wait" message transmission semantics). Note that these function calls 402, 404, and 406 return immediately (with pseudo-output parameter values) to the caller before the function call is relayed to the target side (e.g., callee 144) and executed by accelerator 170. The fourth call in this example, F3 408, is a Type 2 function, and therefore blocks the caller 104. The caller 104 can do useful work, without blocking, while F0 402, F1 404, and F2 406 are being relayed to the callee 144 and executed there. The caller 104 must wait for the response to F3 408 before resuming execution, since the caller depends on the value returned by F3 for making forward progress. As in FIG. 3, the shaded blocks represent network latency. Thus, delay 418 due to reply F0 410, delay 420 due to reply F1 412, delay 422 due to reply F2 414, and delay 424 due to reply F3 416 are represented. Comparing FIG. 4 with FIG. 3, it can be observed that the effective network latency is reduced because code execution is overlapped with network transfers. In general, the greater the ratio of Type 0 and 1 calls to Type 2 calls in an application program, the greater the reduction in network overhead.

Figure 5:
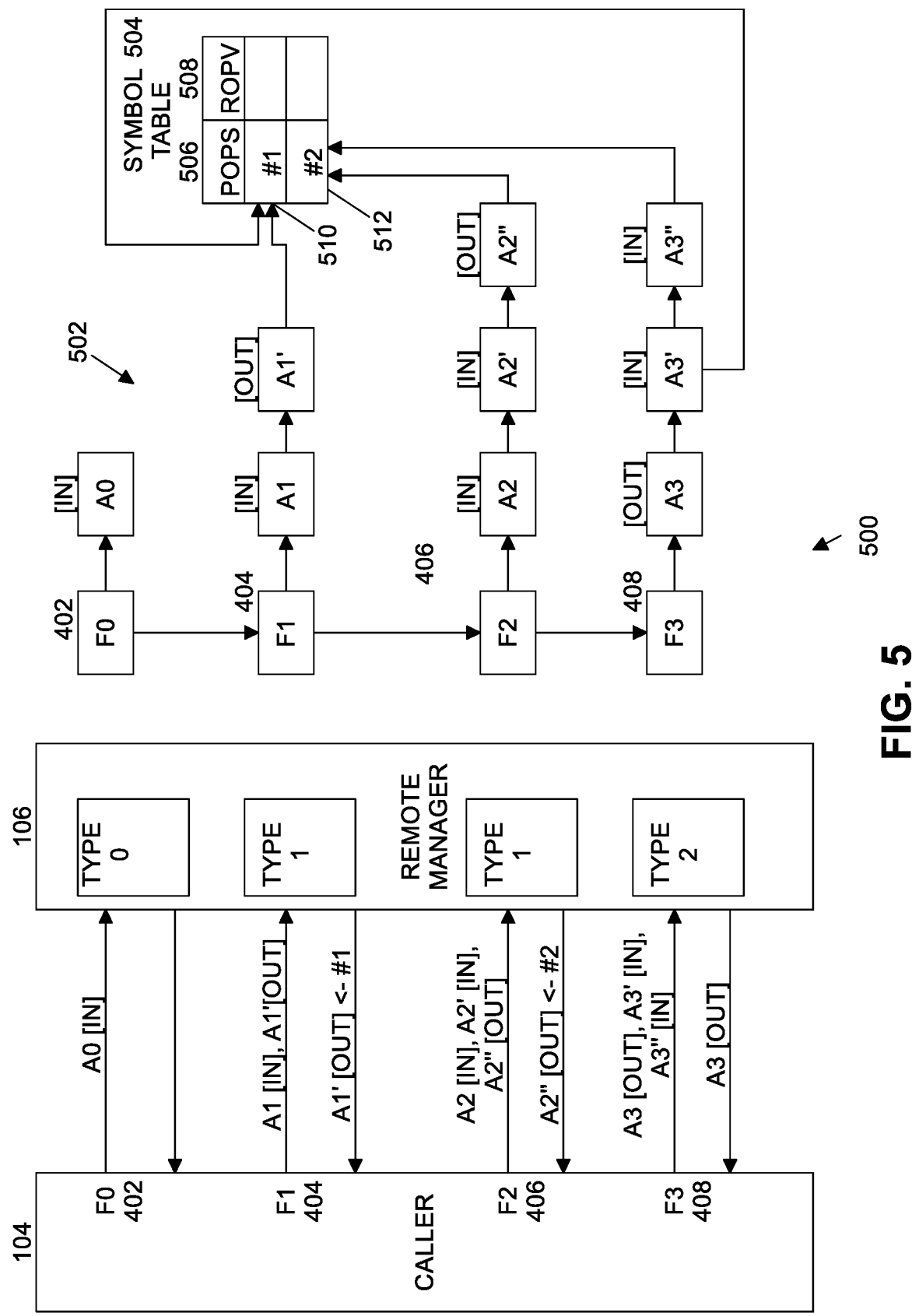
FIG. 5 is a block diagram of an example of caller and remoting manager processing according to one or more embodiments.

FIG. 5 is a block diagram of an example of caller 104 and remoting manager 106 processing 500 according to one or more embodiments. Suppose, for example, the caller 104 invokes a sequence of functions, F0 402, F1 404, F2 406, and F3 408. As in the example of FIG. 4, assume F0 402 is a Type 0 function; F1 404 and F2 406 are Type 1 functions; and F3 408 is a Type 2 function. The input and output parameters for each function are shown in FIG. 5 next to the function names on the arrows. For example, F1 404 takes one input parameter, A1, and one output parameter, A1'. The caller 104 passes in the value for A1 and gets the value for A1' from the callee 144. Similarly, F3 408 takes two input parameters (A3' and A3") and one output parameter, A3. While these function invocations come into the remoting manager 106 from an application (caller 104) or a library above the remoting manager, the remoting manager 106 maintains a data structure called a list of function parameter values 502 to keep track of the sequence of function calls, the various parameters, their types, as well as their values. In one embodiment, the list of function call parameters 502 is a linked list of nodes, with one node for each function. Each function node points to a linked list of the function's arguments. A symbol table 504 is maintained to keep track of pseudo-output parameter values that are returned by the remoting manager 106 to the caller 104 as described further below.

When the remoting manager 106 on the first computing system 102 receives a function call 202 from caller 104, the remoting manager determines the type of the function (Types 0-2). In one implementation of this technology, every function in the API can be assigned one of the three types a priori by analyzing their inputs, outputs and execution semantics. The name of the function and its arguments are entered into the linked list data structure 502. There are three cases to consider, based on the type of the function.

Case 1 (Type 0 function): The remoting manager 106 immediately returns to the caller 104 with a "SUCCESS" status (note: the execution of the function is yet to take place on the target side (e.g., by accelerator 170), but there is no need to block the caller 104). The remoting manager 106 on the caller side relays the function call 202 to the callee 144 side.

Case 2 (Type 1 function): The remoting manager 106 notes that the function has one or more output parameters. In the case of F1 404, for example, there is one output parameter, A1'. In the case of a normal blocking function call, F1 404 would have executed on the target side (by accelerator 170) and returned the value for A1'. Recall that this value is necessary to the caller 104 only to the extent that it (the caller) might need to pass this value back to the callee 144 in the future. The exact value returned to the caller does not matter, as long as the same value is used consistently by the caller, and the callee knows how to substitute the value with the real value. Therefore, the remoting manager 106 on the caller side 104 returns a pseudo-output value to the caller immediately. Remoting manager 106 also records this value in symbol table 504 entry under the Pseudo Output Parameter Symbol (POPS) field 506. In this example, the pseudo-output value is #1 for A1'. Function F2 406 is handled similarly with the creation of another pseudo-output parameter value, #2, for A2". Note that the linked list nodes for the output arguments point to the corresponding entries in symbol table 502. In addition to the name of the function and its argument values, the remoting manager 106 also sends part of the linked list data structure and symbol table entries corresponding to the Type 1 function to the callee 144. For example, in the case of F1, the remoting manager 106 sends the linked list for F1 (and its arguments), as well as the first entry 510 in the symbol table 502 corresponding to parameter A1'. In the case of F2 406, remoting manager 106 sends the linked list of function call parameters for F2 406 and the second entry 512 in the symbol table 502.

Case 3 (Type 2): The remoting manager 106 blocks the caller 104 in this case. Furthermore, if any of the input parameter values match pseudo-output parameter values from earlier functions, the remoting manager adds pointers from the linked list to the corresponding entries in symbol table 502. For example, in the case of F3 408, the values for the two input parameters, A3' and A3" (from the caller 104) match the pseudo-output parameter symbol values #1 and #2, respectively (from earlier function calls F1 404 and F2 406). The remoting manager adds pointers from the linked list to the corresponding symbol table entries. As in the case of the earlier Type 1 calls, the remoting manager 106 sends the list of function arguments and the corresponding symbol table entries to the callee 144.

Figure 6:
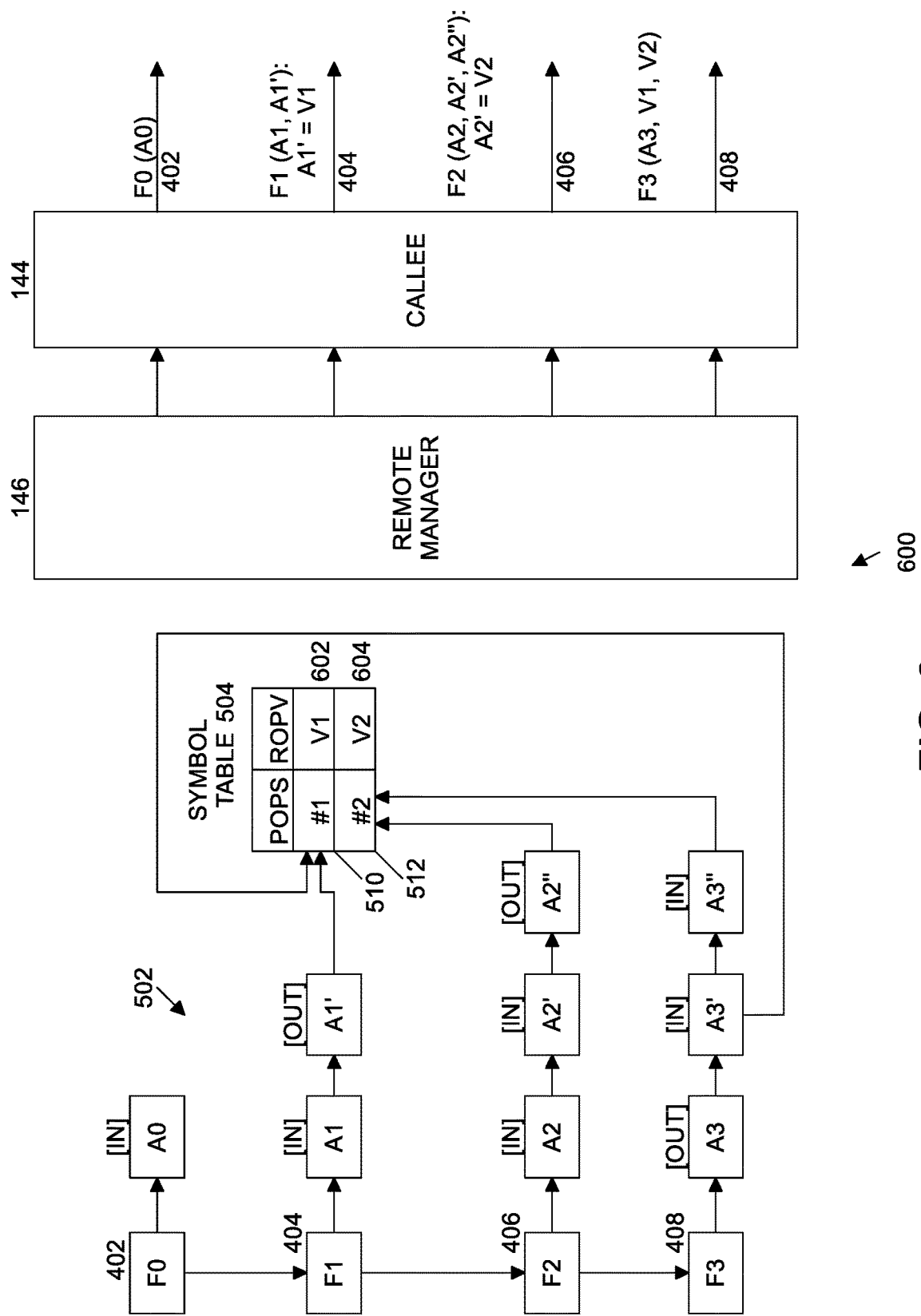
FIG. 6 is a block diagram of an example of callee and remoting manager processing according to one or more embodiments.

FIG. 6 is a block diagram of an example of callee 144 and remoting manager 146 processing 600 according to one or more embodiments. The remoting manager 146 on the target side (e.g., second computing system 142) receives a sequence of function calls F0 402, F1 404, F2 406, and F3 408, along with their input argument values, output arguments, and the entries of the symbol table 504 that apply to each function call. The remoting manager 146 on the callee 144 side invokes the functions on the callee 144 in the software stack (e.g., software device driver for the accelerator 170), in program order. The first function, F0 402, is executed normally. When F1 404 is executed, the remoting manager 146 notes that F1 has one output parameter, A1'. When the callee 144 has finished executing F1 (via processing by accelerator 170), the value of the output argument A1' called V1 herein, is returned to the remoting manager 146. Since A1' has an entry 510 in the symbol table 504 with a pseudo-output parameter symbol denoted by #1, the remoting manager on the target side (e.g., second computing system 142) adds the value V1 to the real output parameter value (ROPV) field 602 of the entry. Thus, remoting manager 146 binds #1 510 with V1 602. Similarly, #2 is mapped/bound to its real value V2 604. When F3 408 is executed by accelerator 170, remoting manager 146 observes that two of the input parameters (A3' and A3") have values in the symbol table 504; viz., #1 510 and #2 512. The symbol table entry also shows that the true values corresponding to #1 and #2 are V1 602 and V2 604, respectively. Therefore, the remoting manager 146 substitutes V1 and V2 for #1 and #2, respectively, before invoking F3 408 on callee 144. Thus, the intent of the caller 104 to pass the values of A1' and A2' as inputs to F3 408 is carried out by the remoting managers 106, 146 and F3 408 is invoked correctly.

This example shows how the technology described herein can efficiently perform remoting of function calls 202 across the network 120 by exploiting the semantic characteristics (Types 0-2) of the APIs to overlap network transfers with code execution on the initiator (caller 104 on first computer system 102) and target side (callee 144 on second computing system 142).

Figure 7:
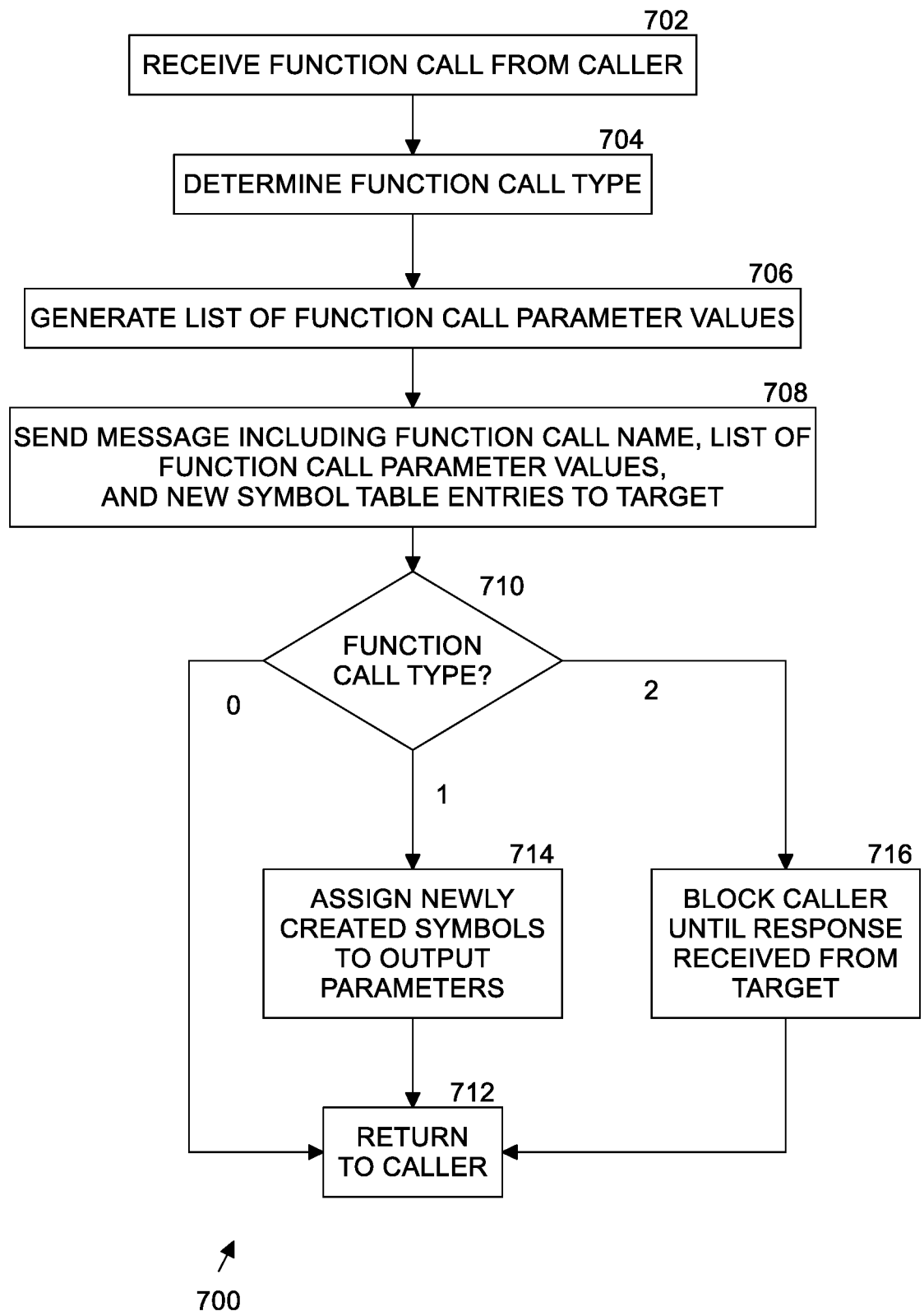
FIG. 7 is a flow diagram of remoting manager processing of an initiator according to one or more embodiments.

FIG. 7 is a flow diagram of remoting manager processing 700 by an initiator according to one or more embodiments. At block 702, remoting manager 106 on an initiator (e.g., first computing system 102) receives a function call from caller 104. At block 704, remoting manager 106 determines the type of the function call. At block 706, remoting manager 106 generates a list of function call parameter values. For each input parameter value that is in the symbol table 504, the remoting manager adds the input parameter value and the symbol table index (of the entry containing the input parameter value) to the list of function call parameter values. For each output parameter, the remoting manager creates a new symbol and adds the new symbol into a new entry in the symbol table 504 and adds the symbol table index of the new entry (for the new symbol) into the list of function call parameter values. At block 708, remoting manager 106 builds a message including the function call name, the list of function call parameter values, and new symbol table entries and sends the message to the remoting manager on the target (e.g., second computing system 142). At block 710, if the function call is type 0, remoting manager 106 returns immediately to the caller 104 at block 712. If the function call type is 1, remoting manager 106 assigns newly created symbols to output parameters at block 714 and returns immediately to the caller 104 at block 712. If the function call type is 2, remoting manager 106 blocks the caller until a response is received from remoting manager 146 on the target. When a response is received, remoting manager 106 unblocks the caller and returns the received response.

An example of a process for implementing remoting manager 106 (initiator side) in pseudo-code in the first computing system 102 is shown below in Table 1.

Table 1

TABLE 1

Copyright © 2021, Intel Corporation. All Rights Reserved.

```
Inputs:
f: function
    params: list of function parameters types and values
Outputs:
    If no errors, returns output argument values;
    otherwise, returns fail status
    1      args = ( )
    2      symbols = ( )
    3      for each p in params do:
    4          a = newarg( )
    5          a.type = p.type
    6          a.symidx = NIL
    7          if (p.type == INPARAM):
    8              POPS = p.val
    9              j = lookup(SYMTAB, POPS)
    10             a.symidx = j
    11             a.val = p.val
    12         if (p.type == OUTPARAMS && f.type == 1):
    13             POPS = newsym 0
    14             j = symadd(SYMTAB, POPS)
    15             Insert(symbols, POPS)
    16             a.symidx = j
    17             output (p. POPS)
    18         add (args. a)
    19
    20     m = req_mesg (f, args, symbols)
    21
    22     switch (f type):
    23         case 0 /* Type 0 */:
    24             async_send(m)
    25             return
    26
    27         case 1 /* Type 1 */:
    28             async_send(m)
    29             return
    30
    31         case 2 /* Type 2 */:
    32             sync_send(m)
    33             return
```

Lines 1 and 2 of Table 1 initialize two lists: (1) args, which will contain information about the function arguments; and (2) symbols, which will contain the pseudo-output parameter symbols (POPS) representing output parameters in Type 1 functions. Each element in the args list is a structure (struct) containing three fields: type (e.g., int, float, etc.); val (value); and symidx (index into Symbol table 504 (SYMTAB) if the input value for the argument matches a pseudo-output parameter value created earlier).

The for-loop (lines 3-18) builds up the args and symbols list. Each parameter of the function is considered in one pass of the loop. If the parameter is an INPUT parameter (Lines 7-11), the symbol table 504 (SYMTAB) is looked up to find its value. If an entry is found with the parameter's value, it means that the value of the argument from the caller is a pseudo-output parameter symbol corresponding to an OUTPUT parameter of another function executed earlier. If the parameter is an OUTPUT parameter of a Type 1 function (Lines 12-17), a new pseudo-output parameter value is created and added to SYMTAB. The symidx field of the argument struct is set to index of the new symbol. This index will be used by the remoting manager 146 on the second computing system 142 to bind a real output parameter value (ROPV) with the POPS symbol after the function has finished execution. In Line 17, the pseudo-output value is copied to the memory location of the output parameter in preparation for the return to the caller 104.

The function, its arguments and any new symbols added to SYMTAB are packaged as a message for the remoting manager in the second computing system (Line 20). Lines 22-33 handle the transmission of the message. Type 0 and 1 function call request messages are sent asynchronously (async_send), without blocking the caller. Type 2 function calls block the caller (sync_send) and only return when the reply message is received from the target.

When the remoting manager 106 on the initiator side (e.g., caller 104 of first computing system 102) receives a response to a function call, it can either be success or an error. Since some functions (Type 0 and 1) are executed asynchronously, it is possible to get an error for an earlier function that already returned to the caller 104 (this is not possible for Type 2 functions, which are synchronous). The (unlikely) error from an earlier asynchronous function call can be propagated as an exception to the caller. Errors from Type 2 function calls are handled normally. Since Type 2 functions can have output parameters, it is necessary to make the value of the output parameters (in memory) consistent between the target and initiator side before returning to the caller.

Figure 8:
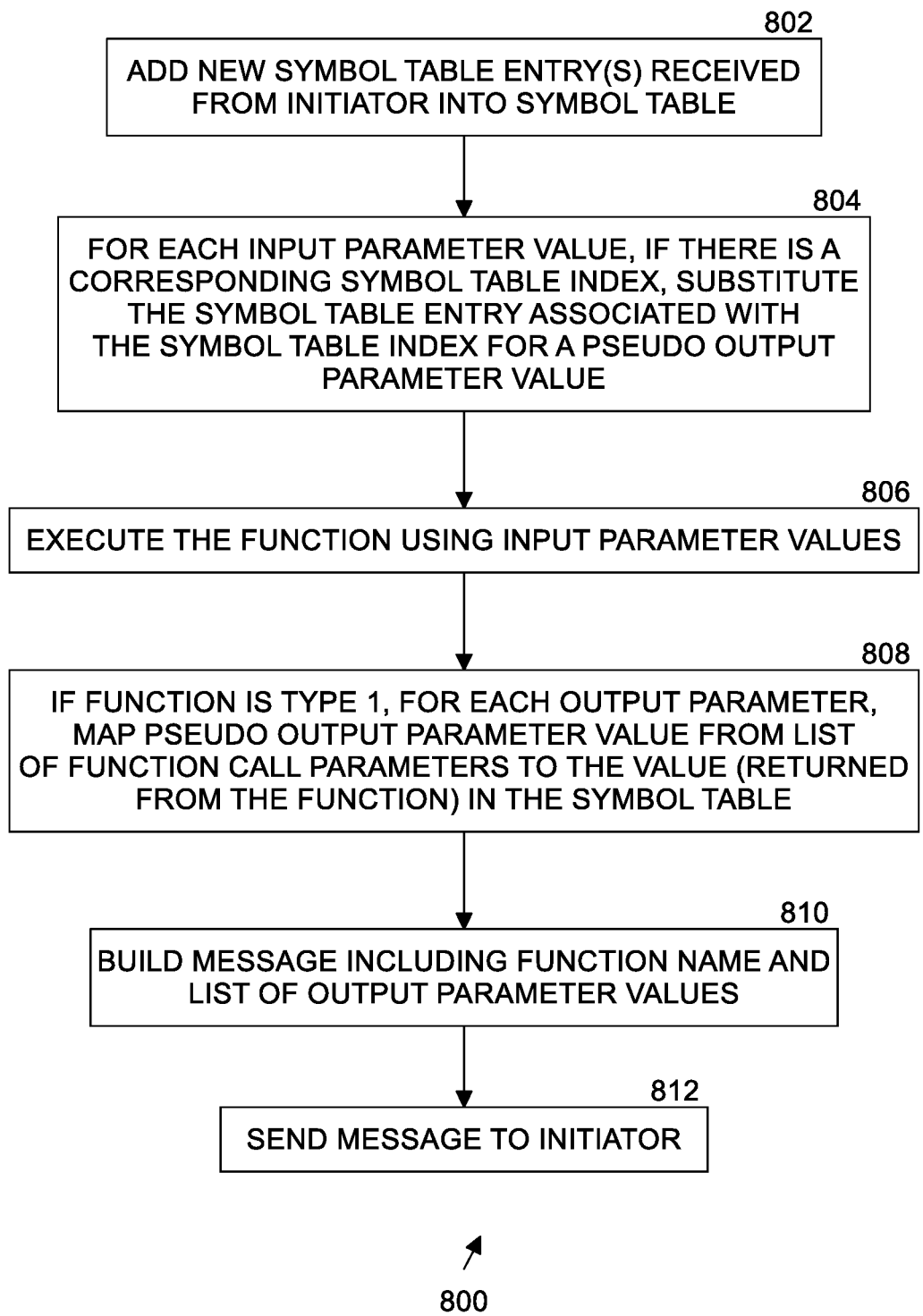
FIG. 8 is a flow diagram of remoting manager processing of a target according to one or more embodiments.

FIG. 8 is a flow diagram of remoting manager processing 800 by a target according to one or more embodiments. When a message is received by target remoting manager 146, at block 802 remoting manager 146 adds a new symbol table entry (received from the initiator remoting manger 106) into the symbol table 504 on the target. There may be one or more new symbol table entries received. At block 804, for each input parameter value, if there is a corresponding symbol table index (received from the initiator in the message), remoting manager 146 substitutes the symbol table entry associated with the symbol table index for a pseudo-output parameter value. The symbol table entry stores the real output parameter value (ROPV). At block 806, the target executes the function using the input parameter values. At block 808, if the function type is 1, for each output parameter (of the function) the remoting manager 146 maps a pseudo-output parameter value from the list of function call parameters to the corresponding real output parameter value (e.g., ROPV, returned from the function) in the symbol table. At block 810, remoting manager 146 builds a message including the function name and the list of output parameter values, and at block 812 remoting manager 146 sends the message to remoting manager 106 on the initiator.

In response to receiving a message from the initiator (e.g., remoting manager 106) with a function call request, the target (e.g., remoting manager 146) performs the example process as shown below in Table 2 after unpacking the message containing the function, parameter types, values and symbol table entries.

TABLE 2

Copyright © 2021, Intel Corporation. All Rights Reserved.

Inputs:
    f: function
    args: function arguments
    symbols: new symbol table entries corresponding
    to output parameters
Outputs:
    If no errors, returns success status, otherwise, returns fail

```
 1    for each s in symbols:
 2        symadd(SYMTAB, s)
 3
 4    for each a in args do:
 5        if (a.type == INPARAM):
 6            if (a.symidx != NIL):
 7                v = getval(SYMTAB, a.symidx)
 8                a.val = v
 9
10    exec(f, args)
11
12    for each a in args do:
13        if (a.type == OUTPARAM && f.type == 1):
14            setval(SYMTAB, a.symidx, a.val)
15
16    m = reply_msg(f, args)
17    async_send(m)
```

Lines 1-2 add new symbols to symbol table 504 (SYMTAB) on the target side (remoting manager 146 on second computing system 142). The for loop in lines 4-8 handle input parameters before the function is executed. Since some of the input parameter values could be pseudo parameter values from earlier function invocations, each INPUT parameter value must be looked up in SYMTAB (line 7) using the symidx index into the table. The real output parameter value (ROPV) corresponding to the symbol is substituted for the pseudo value in line 8. Line 10 executes the function (using accelerator 170) with its correct argument values. The for loop in lines 12-14 handles output parameter values for Type 1 functions. In line 14, the symbol corresponding to the output parameter is bound to the actual output value (from executing the function in line 10). Finally, in lines 16-17, a message with the return arguments is prepared and send asynchronously to the initiator (e.g., remoting manager 106).

Figure 9:
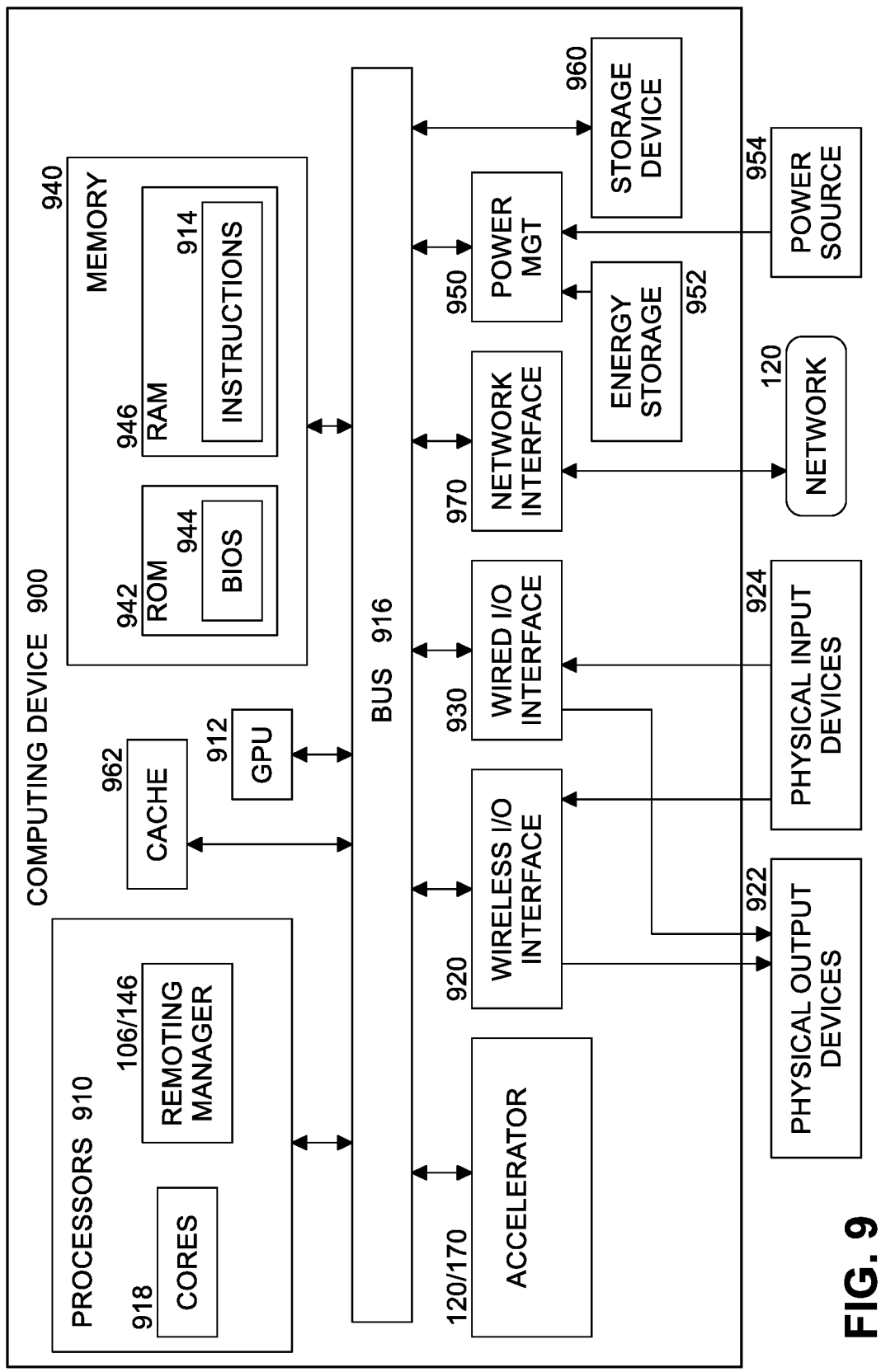
FIG. 9 is a schematic diagram of an illustrative electronic computing device to perform remoting to accelerator processing according to some embodiments.

FIG. 9 is a schematic diagram of an illustrative electronic computing device to perform remoting to an accelerator processing according to some embodiments. Electronic computing device 900 is representative of computing systems 102 and 142. In some embodiments, computing device 900 includes one or more processors 910 including one or more processors cores 918 and remoting manager 106 (for caller 104) or 146 (for callee 144). In some embodiments, the computing device 900 includes an accelerator 120 or 170. In some embodiments, the computing device performs remoting processing as described above in FIGS. 1-8.

Computing device 900 may additionally include one or more of the following: cache 962, a graphical processing unit (GPU) 912 (which may be hardware accelerator 120/170 in some implementations), a wireless input/output (I/O) interface 920, a wired I/O interface 930, memory circuitry 940, power management circuitry 950, non-transitory storage device 960, and a network interface 970 for connection to a network 120. The following discussion provides a brief, general description of the components forming the illustrative computing device 900. Example, non-limiting computing devices 900 may include a desktop computing device, blade server device, workstation, laptop computer, mobile phone, tablet computer, personal digital assistant, or similar device or system.

In embodiments, the processor cores 918 are capable of executing machine-readable instruction sets 914, reading data and/or instruction sets 914 from one or more storage devices 960 and writing data to the one or more storage devices 960. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, FPAGs, Internet of Things (IOT) devices, and the like. For example, machine-readable instruction sets 914 may include instructions to implement remoting processing, as provided in FIGS. 1-8.

The processor cores 918 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions.

The computing device 900 includes a bus or similar communications link 916 that communicably couples and facilitates the exchange of information and/or data between various system components including the processor cores 918, the cache 962, the graphics processor circuitry 912, one or more wireless I/O interfaces 920, one or more wired I/O interfaces 930, one or more storage devices 960, and/or one or more network interfaces 970. The computing device 900 may be referred to in the singular herein, but this is not intended to limit the embodiments to a single computing device 900, since in certain embodiments, there may be more than one computing device 900 that incorporates, includes, or contains any number of communicably coupled, collocated, or remote networked circuits or devices.

The processor cores 918 may include any number, type, or combination of currently available or future developed devices capable of executing machine-readable instruction sets.

The processor cores 918 may include (or be coupled to) but are not limited to any current or future developed single-core or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 9 are of conventional design. Consequently, such blocks need not be described in further detail herein, as they will be understood by those skilled in the relevant art. The bus 916 that interconnects at least some of the components of the computing device 900 may employ any currently available or future developed serial or parallel bus structures or architectures.

The system memory 940 may include read-only memory ("ROM") 942 and random-access memory ("RAM") 946. A portion of the ROM 942 may be used to store or otherwise retain a basic input/output system ("BIOS") 944. The BIOS 944 provides basic functionality to the computing device 900, for example by causing the processor cores 918 to load and/or execute one or more machine-readable instruction sets 914. In embodiments, at least some of the one or more machine-readable instruction sets 914 causes at least a portion of the processor cores 918 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 900 may include at least one wireless input/output (I/O) interface 920. The at least one wireless I/O interface 920 may be communicably coupled to one or more physical output devices 922 (tactile devices, video displays, audio output devices, hardcopy output devices, etc.). The at least one wireless I/O interface 920 may communicably couple to one or more physical input devices 924 (pointing devices, touchscreens, keyboards, tactile devices, etc.). The at least one wireless I/O interface 920 may include any currently available or future developed wireless I/O interface. Example wireless I/O interfaces include, but are not limited to: BLUETOOTH®, near field communication (NFC), and similar.

The computing device 900 may include one or more wired input/output (I/O) interfaces 930. The at least one wired I/O interface 930 may be communicably coupled to one or more physical output devices 922 (tactile devices, video displays, audio output devices, hardcopy output devices, etc.). The at least one wired I/O interface 930 may be communicably coupled to one or more physical input devices 924 (pointing devices, touchscreens, keyboards, tactile devices, etc.). The wired I/O interface 930 may include any currently available or future developed I/O interface. Example wired I/O interfaces include but are not limited to universal serial bus (USB), IEEE 1394 ("FireWire"), and similar.

The computing device 900 may include one or more communicably coupled, non-transitory, data storage devices 960. The data storage devices 960 may include one or more hard disk drives (HDDs) and/or one or more solid-state storage devices (SSDs). The one or more data storage devices 960 may include any current or future developed storage appliances, network storage devices, and/or systems. Non-limiting examples of such data storage devices 960 may include, but are not limited to, any current or future developed non-transitory machine-readable storage mediums, storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 960 may include one or more removable storage devices, such as one or more flash drives, flash memories, flash storage units, or similar appliances or devices capable of communicable coupling to and decoupling from the computing device 900.

The one or more data storage devices 960 may include interfaces or controllers (not shown) communicatively coupling the respective storage device or system to the bus 916. The one or more data storage devices 960 may store, retain, or otherwise contain machine-readable instruction sets, data structures, program modules, data stores, databases, logical structures, and/or other data useful to the processor cores 918 and/or graphics processor circuitry 912 and/or one or more applications executed on or by the processor cores 918 and/or graphics processor circuitry 912. In some instances, one or more data storage devices 960 may be communicably coupled to the processor cores 918, for example via the bus 916 or via one or more wired communications interfaces 930 (e.g., Universal Serial Bus or USB); one or more wireless communications interfaces 920 (e.g., Bluetooth®, Near Field Communication or NFC); and/or one or more network interfaces 970 (IEEE 802.3 or Ethernet, IEEE 802.11, or Wi-Fi®, etc.).

Processor-readable instruction sets 914 and other programs, applications, logic sets, and/or modules may be stored in whole or in part in the system memory 940. Such instruction sets 914 may be transferred, in whole or in part, from the one or more data storage devices 960. The instruction sets 914 may be loaded, stored, or otherwise retained in system memory 940, in whole or in part, during execution by the processor cores 918 and/or graphics processor circuitry 912.

The computing device 900 may include power management circuitry 950 that controls one or more operational aspects of the energy storage device 952. In embodiments, the energy storage device 952 may include one or more primary (i.e., non-rechargeable) or secondary (i.e., rechargeable) batteries or similar energy storage devices. In embodiments, the energy storage device 952 may include one or more supercapacitors or ultracapacitors. In embodiments, the power management circuitry 950 may alter, adjust, or control the flow of energy from an external power source 954 to the energy storage device 952 and/or to the computing device 900. The power source 954 may include, but is not limited to, a solar power system, a commercial electric grid, a portable generator, an external energy storage device, or any combination thereof.

For convenience, the processor cores 918, the graphics processor circuitry 912, the wireless I/O interface 920, the wired I/O interface 930, the storage device 960, and the network interface 970 are illustrated as communicatively coupled to each other via the bus 916, thereby providing connectivity between the above-described components. In alternative embodiments, the above-described components may be communicatively coupled in a different manner than illustrated in FIG. 9. For example, one or more of the above-described components may be directly coupled to other components, or may be coupled to each other, via one or more intermediary components (not shown). In another example, one or more of the above-described components may be integrated into the processor cores 918 and/or the graphics processor circuitry 912. In some embodiments, all or a portion of the bus 916 may be omitted and the components are coupled directly to each other using suitable wired or wireless connections.

Flowcharts representative of example hardware logic, non-tangible machine-readable instructions, hardware implemented state machines, and/or any combination thereof for implementing computing device 900, for example, are shown in FIGS. 3-8. The machine-readable instructions may be one or more executable programs or portion(s) of an executable program for execution by a computer processor such as the processor 910 shown in the example computing device 900 discussed. The program may be embodied in software stored on a non-transitory computer readable storage medium such as a CD-ROM, a floppy disk, a hard drive, a DVD, a Blu-ray disk, or a memory associated with the processor 910, but the entire program and/or parts thereof could alternatively be executed by a device other than the processor 910 and/or embodied in firmware or dedicated hardware. Further, although the example program is described with reference to the flowcharts illustrated in FIGS. 3-8, many other methods of implementing the example computing devices 900 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer system, but require addition of a library (e.g., a dynamic link library (DLL)), a software development kit (SDK), an application programming interface (API), etc., in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-8 may be implemented using executable instructions (e.g., computer and/or machine-readable instructions) stored on a non-transitory computer and/or machine-readable medium such as a hard disk drive, an SSD, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus including a processor; and a memory device coupled to the processor, the memory device having instructions stored thereon that, in response to execution by the processor, cause the processor to: receive, on a first computing system acting as an initiator, a first function call from a caller, the first function call to be executed by an accelerator on a second computing system acting as a target, the first computing system coupled to the second computing system by a network; determine a type of the first function call; generate a list of parameter values of the first function call; send a first message including a name of the first function call, the list of parameter values of the first function call, and one or more new entries for a symbol table, the one or more new entries representing pseudo-output parameter values, to the second computing system; and when the type of the first function call is an asynchronously callable function without output dependencies, return to the caller; when the type of the first function call is an asynchronously callable function with substitutable output parameters, assign newly created symbols to output parameters and return to the caller; and when the type of the first function call is a synchronous function, block the caller until a response to the first message is received from the second computing system.

In Example 2, the subject matter of Example 1 can optionally include instructions that in response to execution by the processor, cause the processor to unblock the caller when the response to the first message is received from the second computing system when the type of the first function call is synchronous function.

In Example 3, the subject matter of Example 1 can optionally include wherein the first function call is a request to offload performance of a workload from the first computing system to the accelerator on the second computing system.

In Example 4, the subject matter of Example 1 can optionally include instructions that in response to execution by the processor, cause the processor to: receive, on the first computing system acting as a target, a second message including a name of a second function call, the list of parameter values of the second function call, and one or more new entries for a symbol table, the one or more new entries representing pseudo-output parameter values, from the second computing system as an initiator; add the one or more new entries from the second message into the symbol table; for each input parameter value in the list of parameter values of the second function call, if there is a corresponding symbol table index, substitute a symbol table entry associated with the corresponding symbol table index for a pseudo-output parameter value; execute the function by an accelerator on the first computing system using the input parameter values; when the type of the second function call is the asynchronously callable function with substitutable output parameters, for each output parameter in the list of parameter values, map a pseudo-output parameter value from the list of parameter values of the second function call to a corresponding output value in the symbol table; and send a second message including the name of the second function call and a list of output parameter values to the second computing system.

In Example 5, the subject matter of Example 4 can optionally include wherein the second function call is a request to offload performance of a workload from the second computing system to the accelerator on the first computing system.

Example 6 is a method including receiving, on a first computing system acting as an initiator, a first function call from a caller, the first function call to be executed by an accelerator on a second computing system acting as a target, the first computing system coupled to the second computing system by a network; determining a type of the first function call; generating a list of parameter values of the first function call; sending a first message including a name of the first function call, the list of parameter values of the first function call, and one or more new entries for a symbol table, the one or more new entries representing pseudo-output parameter values, to the second computing system; and when the type of the first function call is an asynchronously callable function without output dependencies, returning to the caller; when the type of the first function call is an asynchronously callable function with substitutable output parameters, assigning newly created symbols to output parameters and returning to the caller; and when the type of the first function call is a synchronous function, blocking the caller until a response to the first message is received from the second computing system.

In Example 7, the subject matter of Example 6 can optionally include unblocking the caller when the response to the first message is received from the second computing system when the type of the first function call is synchronous function.

In Example 8, the subject matter of Example 6 can optionally include wherein the first function call is a request to offload performance of a workload from the first computing system to the accelerator on the second computing system.

In Example 9, the subject matter of Example 6 can optionally include receiving, on the first computing system acting as a target, a second message including a name of a second function call, the list of parameter values of the second function call, and one or more new entries for a symbol table, the one or more new entries representing pseudo-output parameters values, from the second computing system as an initiator; adding the one or more new entries from the second message into the symbol table; for each input parameter value in the list of parameter values of the second function call, if there is a corresponding symbol table index, substituting the symbol table entry associated with the corresponding symbol table index for a pseudo-output parameter value; executing the function by an accelerator on the first computing system using the input parameter values; when the type of the second function call is the asynchronously callable function with substitutable output parameters, for each output parameter in the list of parameter values, mapping a pseudo-output parameter value from the list of parameter values of the second function call to a corresponding output value in the symbol table; and sending a second message including the name of the second function call and a list of output parameter values to the second computing system.

In Example 10, the subject matter of Example 9 can optionally include wherein the second function call is a request to offload performance of a workload from the second computing system to the accelerator on the first computing system.

Example 11 is at least one non-transitory machine-readable storage medium comprising instructions that, when executed, cause at least one processor to at least: receive, on a first computing system acting as an initiator, a first function call from a caller, the first function call to be executed by an accelerator on a second computing system acting as a target, the first computing system coupled to the second computing system by a network; determine a type of the first function call; generate a list of parameter values of the first function call; send a first message including a name of the first function call, the list of parameter values of the first function call, and one or more new entries for a symbol table, the one or more new entries representing pseudo-output parameters values, to the second computing system; and when the type of the first function call is an asynchronously callable function without output dependencies, return to the caller; when the type of the first function call is an asynchronously callable function with substitutable output parameters, assign newly created symbols to output parameters and return to the caller; and when the type of the first function call is a synchronous function, block the caller until a response to the first message is received from the second computing system.

In Example 12, the subject matter of Example 11 can optionally include instructions, when executed further cause the at least one processor to unblock the caller when the response to the first message is received from the second computing system when the type of the first function call is synchronous function.

In Example 13, the subject matter of Example 11 can optionally include wherein the first function call is a request to offload performance of a workload from the first computing system to the accelerator on the second computing system.

In Example 14, the subject matter of Example 11 can optionally include instructions that, when executed, cause at least one processor to receive, on the first computing system acting as a target, a second message including a name of a second function call, the list of parameter values of the second function call, and one or more new entries for a symbol table, the one or more new entries representing pseudo-output parameters values, from the second computing system as an initiator; add the one or more new entries from the second message into the symbol table; for each input parameter value in the list of parameter values of the second function call, if there is a corresponding symbol table index, substitute a symbol table entry associated with the corresponding symbol table index for a pseudo-output parameter value; execute the function by an accelerator on the first computing system using the input parameter values; when the type of the second function call is the asynchronously callable function with substitutable output parameters, for each output parameter in the list of parameter values, map a pseudo-output parameter value from the list of parameter values of the second function call to a corresponding output value in the symbol table; and send a second message including the name of the second function call and a list of output parameter values to the second computing system.

In Example 15, the subject matter of Example 14 can optionally include wherein the second function call is a request to offload performance of a workload from the second computing system to the accelerator on the first computing system.

Example 16 is a system including a first computing system acting as an initiator; and a second computing system acting as a target, the second computing coupled to the first computing system by a network, the second computing system including an accelerator; wherein the first computing system is to receive a function call from a caller; determine a type of the function call; generate a list of parameter values of the function call; send a first message including a name of the function call, the list of parameter values of the function call, and one or more new entries for a symbol table, the one or more new entries representing pseudo-output parameters values, to the second computing system; and when the type of the function call is an asynchronously callable function without output dependencies, return to the caller; when the type of the function call is an asynchronously callable function with substitutable output parameters, assign newly created symbols to output parameters and return to the caller; and when the type of the function call is a synchronous function, block the caller until a response to the first message is received from the second computing system; and wherein the second computing system is to receive the first message; add the one or more new entries from the first message into the symbol table; for each input parameter value in the list of parameter values of the function call, if there is a corresponding symbol table index, substitute a symbol table entry associated with the corresponding symbol table index for a pseudo-output parameter value; execute the function by the accelerator using the input parameter values; when the type of the function call is the asynchronously callable function with substitutable output parameters, for each output parameter in the list of parameter values, map a pseudo-output parameter value from the list of parameter values of the function call to a corresponding output value in the symbol table; and send a second message including the name of the function call and a list of output parameter values to the first computing system.

In Example 17, the subject matter of Example 16 can optionally include wherein the first computing system is to unblock the caller when the response to the first message is received from the second computing system when the type of the function call is synchronous function.

In Example 18, the subject matter of Example 16 can optionally include wherein the function call is a request to offload performance of a workload from the first computing system to the accelerator on the second computing system.

The invention claimed is:

1. An apparatus comprising:
a processor; and
a memory device coupled to the processor, the memory device having instructions stored thereon that, in response to execution by the processor, cause the processor to:
receive, on a first computing system acting as an initiator, a first function call from a caller, the first function call to be executed by an accelerator on a second computing system acting as a target, the first computing system coupled to the second computing system by a network;
determine a type of the first function call;
generate a list of parameter values of the first function call;
send a first message including a name of the first function call, the list of parameter values of the first function call, and one or more new entries for a symbol table, the one or more new entries representing pseudo-output parameter values, to the second computing system; and
when the type of the first function call is an asynchronously callable function without output dependencies, return control to the caller; when the type of the first function call is an asynchronously callable function with substitutable output parameters, assign newly created symbols to output parameters and return control to the caller; and when the type of the first function call is a synchronous function, block the caller until a response to the first message is received from the second computing system.

2. The apparatus of claim 1, the memory device having instructions stored thereon that, in response to execution by the processor, cause the processor to:
unblock the caller when the response to the first message is received from the second computing system when the type of the first function call is synchronous function.

3. The apparatus of claim 1, wherein the first function call is a request to offload performance of a workload from the first computing system to the accelerator on the second computing system.

4. The apparatus of claim 1, the memory device having instructions stored thereon that, in response to execution by the processor, cause the processor to:
receive, on the first computing system, a second message including a name of a second function call, a list of parameter values of the second function call, and one or more new entries for the symbol table, the one or more new entries representing pseudo-output parameter values, from the second computing system;
add the one or more new entries from the second message into the symbol table;
for each input parameter value in the list of parameter values of the second function call, if there is a corresponding symbol table index, substitute a symbol table entry associated with the corresponding symbol table index for a pseudo-output parameter value;
execute the function by an accelerator on the first computing system using the input parameter values;
when the type of the second function call is the asynchronously callable function with substitutable output parameters, for each output parameter in the list of parameter values of the second function call, map a pseudo-output parameter value from the list of parameter values of the second function call to a corresponding output value in the symbol table; and
send a third message including the name of the second function call and a list of output parameter values to the second computing system.

5. The apparatus of claim 4, wherein the second function call is a request to offload performance of a workload from the second computing system to the accelerator on the first computing system.

6. A method comprising:
receiving, on a first computing system acting as an initiator, a first function call from a caller, the first function call to be executed by an accelerator on a second computing system acting as a target, the first computing system coupled to the second computing system by a network;
determining a type of the first function call;
generating a list of parameter values of the first function call;
sending a first message including a name of the first function call, the list of parameter values of the first function call, and one or more new entries for a symbol table, the one or more new entries representing pseudo-output parameter values, to the second computing system; and when the type of the first function call is an asynchronously callable function without output dependencies, returning control to the caller; when the type of the first function call is an asynchronously callable function with substitutable output parameters, assigning newly created symbols to output parameters and returning control to the caller; and when the type of the first function call is a synchronous function, blocking the caller until a response to the first message is received from the second computing system.

7. The method of claim 6, comprising unblocking the caller when the response to the first message is received from the second computing system when the type of the first function call is synchronous function.

8. The method of claim 6, wherein the first function call is a request to offload performance of a workload from the first computing system to the accelerator on the second computing system.

9. The method of claim 6, comprising:
receiving, on the first computing system, a second message including a name of a second function call, a list of parameter values of the second function call, and one or more new entries for the symbol table, the one or more new entries representing pseudo-output parameters values, from the second computing system;
adding the one or more new entries from the second message into the symbol table;
for each input parameter value in the list of parameter values of the second function call, if there is a corresponding symbol table index, substituting the symbol table entry associated with the corresponding symbol table index for a pseudo-output parameter value;
executing the function by an accelerator on the first computing system using the input parameter values;
when the type of the second function call is the asynchronously callable function with substitutable output parameters, for each output parameter in the list of parameter values of the second function call, mapping a pseudo-output parameter value from the list of parameter values of the second function call to a corresponding output value in the symbol table; and
sending a third message including the name of the second function call and a list of output parameter values to the second computing system.

10. The method of claim 9, wherein the second function call is a request to offload performance of a workload from the second computing system to the accelerator on the first computing system.

11. At least one non-transitory machine-readable storage medium comprising instructions that, when executed, cause at least one processor to:
receive, on a first computing system acting as an initiator, a first function call from a caller, the first function call to be executed by an accelerator on a second computing system as a target, the first computing system coupled to the second computing system by a network;
determine a type of the first function call;
generate a list of parameter values of the first function call;
send a first message including a name of the first function call, the list of parameter values of the first function call, and one or more new entries for a symbol table, the one or more new entries representing pseudo-output parameters values, to the second computing system; and
when the type of the first function call is an asynchronously callable function without output dependencies, return control to the caller; when the type of the first function call is an asynchronously callable function with substitutable output parameters, assign newly created symbols to output parameters and return control to the caller; and when the type of the first function call is a synchronous function, block the caller until a response to the first message is received from the second computing system.

12. The at least one non-transitory machine-readable storage medium of claim 11, wherein the instructions, when executed further cause the at least one processor to unblock the caller when the response to the first message is received from the second computing system when the type of the first function call is synchronous function.

13. The at least one non-transitory machine-readable storage medium of claim 11, wherein the first function call is a request to offload performance of a workload from the first computing system to the accelerator on the second computing system.

14. The at least one non-transitory machine-readable storage medium of claim 11 comprising instructions that, when executed, cause at least one processor to:
receive, on the first computing system, a second message including a name of a second function call, a list of parameter values of the second function call, and one or more new entries for the symbol table, the one or more new entries representing pseudo-output parameters values, from the second computing system;
add the one or more new entries from the second message into the symbol table;
for each input parameter value in the list of parameter values of the second function call, if there is a corresponding symbol table index, substitute a symbol table entry associated with the corresponding symbol table index for a pseudo-output parameter value;
execute the function by an accelerator on the first computing system using the input parameter values;
when the type of the second function call is the asynchronously callable function with substitutable output parameters, for each output parameter in the list of parameter values of the second function call, map a pseudo-output parameter value from the list of parameter values of the second function call to a corresponding output value in the symbol table; and
send a third message including the name of the second function call and a list of output parameter values to the second computing system.

15. The at least one non-transitory machine-readable storage medium of claim 14, wherein the second function call is a request to offload performance of a workload from the second computing system to the accelerator on the first computing system.

16. A system comprising:
a first computing system acting as an initiator; and
a second computing system acting as a target, the second computing coupled to the first computing system by a network, the second computing system including an accelerator;
wherein the first computing system is to receive a function call from a caller; determine a type of the function call; generate a list of parameter values of the function call; send a first message including a name of the function call, the list of parameter values of the function call, and one or more new entries for a symbol table, the one or more new entries representing pseudo-output parameters values, to the second computing system; and
when the type of the function call is an asynchronously callable function without output dependencies, return control to the caller; when the type of the function call is an asynchronously callable function with substitutable output parameters, assign newly created symbols to output parameters and return control to the caller; and when the type of the function call is a synchronous function, block the caller until a response to the first message is received from the second computing system; and wherein the second computing system is to receive the first message; add the one or more new entries from the first message into the symbol table; for each input parameter value in the list of parameter values of the function call, if there is a corresponding symbol table index, substitute a symbol table entry associated with the corresponding symbol table index for a pseudo-output parameter value; execute the function by the accelerator using the input parameter values; when the type of the function call is the asynchronously callable function with substitutable output parameters, for each output parameter in the list of parameter values, map a pseudo-output parameter value from the list of parameter values of the function call to a corresponding output value in the symbol table; and send a second message including the name of the function call and a list of output parameter values to the first computing system.

17. The system of claim 16, wherein the first computing system is to unblock the caller when the response to the first message is received from the second computing system when the type of the function call is synchronous function.

18. The system of claim 16, wherein the function call is a request to offload performance of a workload from the first computing system to the accelerator on the second computing system.

\* \* \* \* \*